US009428129B2

(12) United States Patent
Crona et al.

(10) Patent No.: US 9,428,129 B2
(45) Date of Patent: Aug. 30, 2016

(54) FRONT STRUCTURE OF A VEHICLE (71) Applicant: VOLVO CAR CORPORATION, Gothenburg (SE)

(72) Inventors: Ragnar Crona, Askim (SE); Graeme McInally, Torslanda (SE); Henrik Ljungquist, Torslanda (SE); Tom Stoddart, Molndal (SE); Babak Nejabat, Torslanda (SE); Linus Wagstrom, Nodinge (SE); Zef Van Der Putten, Alingsas (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/566,765

(22) Filed: Dec. 11, 2014

(65) Prior Publication Data

US 2015/0165994 A1    Jun. 18, 2015

(30) Foreign Application Priority Data

Dec. 18, 2013  (EP) .................................... 13197917

(51) Int. Cl.
| | |
|---|---|
| *B62D 21/15* | (2006.01) |
| *B62D 25/08* | (2006.01) |
| *B60R 19/34* | (2006.01) |

(52) U.S. Cl.
CPC .............. *B60R 19/34* (2013.01); *B62D 21/152* (2013.01); *B62D 25/082* (2013.01); *B60G 2206/016* (2013.01)

(58) Field of Classification Search
CPC .... B60R 19/34; B62D 21/152; B62D 25/082; B60G 2206/016
USPC .......... 296/187.09, 203.02; 293/133; 280/784
See application file for complete search history.

(56) References Cited

U.S. PATENT DOCUMENTS

| | | |
|---|---|---|
| 6,113,178 A | 9/2000 | Faigle |
| 6,705,670 B2 | 3/2004 | Forssell et al. |
| 7,556,310 B2 | 7/2009 | Miki |

(Continued)

FOREIGN PATENT DOCUMENTS

| | | |
|---|---|---|
| EP | 2423078 A1 | 2/2012 |
| JP | 391282 U | 9/1991 |

(Continued)

OTHER PUBLICATIONS

Extended European Search Report Dated May 16, 2014, Application No. 13197917.1-1755, Applicant Volvo Car Corporation, 10 Pages.

*Primary Examiner* — Jason S Morrow
(74) *Attorney, Agent, or Firm* — Brooks Kushman P.C.

(57) ABSTRACT

A front structure of a vehicle comprises a pair of side members arranged in a longitudinal direction of the vehicle, a pair of crash boxes arranged at front ends of the side members, and a body back-up structure located at a rear end of the front portion. The front structure is adapted to give an impact response curve with deceleration versus time, when subjected to a full frontal barrier impact at 35 mph according to USNCAP. The impact response curve comprises in sequence:
 a first phase during which deceleration increases,
 a second phase forming a first peak level of the deceleration,
 a third phase during which the deceleration is less than during the second phase, and
 a fourth phase forming a second peak level of the deceleration, during which fourth phase the deceleration is greater than during the third phase.

20 Claims, 9 Drawing Sheets

(56) References Cited

U.S. PATENT DOCUMENTS

| | | | |
|---|---|---|---|
| 9,150,251 B2* | 10/2015 | Ghislieri | B62D 21/152 |
| 2008/0197672 A1* | 8/2008 | Yamaguchi | B62D 21/155 |
| | | | 296/187.09 |
| 2011/0198832 A1 | 8/2011 | Takeshita et al. | |
| 2011/0316295 A1 | 12/2011 | Yamada et al. | |
| 2012/0248820 A1* | 10/2012 | Yasui | B60R 19/34 |
| | | | 296/187.09 |
| 2014/0239671 A1* | 8/2014 | Mori | F16F 7/12 |
| | | | 296/187.09 |
| 2014/0246880 A1* | 9/2014 | Barbat | B62D 21/152 |
| | | | 296/187.1 |
| 2015/0166108 A1* | 6/2015 | Persson | B62D 21/152 |
| | | | 296/187.09 |

FOREIGN PATENT DOCUMENTS

| | | |
|---|---|---|
| JP | 2000016327 A | 1/2000 |
| JP | 2002002528 A | 1/2002 |
| JP | 2004148960 A | 5/2004 |
| JP | 2007216901 A | 8/2007 |
| JP | 2008222185 A | 9/2008 |

* cited by examiner

FRONT STRUCTURE OF A VEHICLE

CROSS-REFERENCE TO RELATED APPLICATIONS

This application claims foreign priority benefits under 35 U.S.C. §119(a)-(d) to European patent application number EP 13197917.1, filed Dec. 18, 2013, which is incorporated by reference in its entirety.

TECHNICAL FIELD

The present disclosure relates to a front structure of a vehicle.

BACKGROUND

When a vehicle, such as a car, is involved in a frontal collision, the collision impact is, at least partly, absorbed by a front structure of the vehicle. It is therefore desirable, that the front structure is adapted in such a way that a vehicle occupant is subjected to no, or as little, risk of injury as possible.

In order to evaluate the collision impact absorption properties of a front structure of a vehicle, a test comprising a full frontal barrier impact at 35 mph according to USNCAP may be performed. NCAP means New Car Assessment Program.

Document JP 2000-16327 A discloses a front structure, which is able to absorb, at least partly, a collision impact in case of a frontal collision. The front structure is provided with a sub frame and a front side member to be connected to the sub frame through a mount bracket. The front side member comprises a forward part located forward of the mount bracket, and a rear part located in the rear. The forward part of the front side member is formed to be compressed and deformed, when a specified first axial load is applied from a forward part, and the rear part of the front side member is formed so as not to be deformed when the first axial load is applied from the forward part, and so as to be bent and deformed when a specified second axial load is applied from a forward part.

However, in order to even further minimize, or avoid, the risk of injury to the vehicle occupant there is a desire for an improved front structure.

SUMMARY

An object of the present disclosure is to overcome or ameliorate at least one of the disadvantages of the prior art, or to provide a useful alternative.

Thus, in a first aspect of the present disclosure there is provided a front structure of a vehicle. The front structure comprises:
- a front exterior and/or a bumper,
- a pair of side members arranged in a longitudinal direction of the vehicle at a respective left-side portion and right-hand portion of a front portion of the vehicle,
- a pair of crash boxes arranged at a respective front end of each of the side members, the crash boxes having a lower axial strength than the side members,
- at least one stiff component, such as an engine, and
- a body back-up structure, located at a rear end of the front portion.

The front structure is adapted to give an impact response curve with deceleration versus time, when subjected to a full frontal barrier impact at 35 mph according to USNCAP. The impact response curve comprises in sequence:
- a first phase, during which deceleration increases,
- a second phase, forming a first peak level of the deceleration,
- a third phase, during which the deceleration is less than during the second phase, and
- a fourth phase, forming a second peak level of the deceleration, during which fourth phase the deceleration is greater than during the third phase.

Terms related to directions as used herein, such as longitudinal, transverse, lateral, vertical and outwards, refer to the front structure arrangement as mounted in a vehicle, which is assumed to stand on flat ground. Terms related to positions, such as in front of, behind or beside, also refer to the front structure arrangement as mounted in a vehicle, which is assumed to stand on flat ground.

The front exterior and the bumper are located at a front end of the front portion of the vehicle. The front exterior may be a soft nose, which is a term commonly used for a front plastic cover of the vehicle. The crash boxes are located inside the bumper, i.e., behind the bumper as seen in the longitudinal direction of the vehicle. Each crash box has a lower axial strength than the side member it is attached to, such that the crash box starts to deform before the side member to which it is attached starts to deform, when subjected to the forces of a frontal collision.

The front structure comprises one or more stiff elements, e.g., the engine. The stiff elements are stiffer, i.e., less compressible and/or less deformable, than the front exterior, bumper, crash boxes and side members. Thus the shape of the stiff element remains more or less unaffected during the frontal collision, although the position of it changes relative to the rest of the front portion, as the stiff element is displaced rearwards, i.e., towards the passenger compartment.

It is, in general, desirable that as much as possible of the velocity change is achieved during the first and second phases of the collision, i.e., before the vehicle occupant begins to experience deceleration effects when interacting with interior protection systems of the vehicle.

The deceleration during the third phase of the collision is lower than during the second phase of the collision, i.e., the third phase forms a "valley" in the impact response curve, between the two peak levels of the second phase and the fourth phase. This is beneficial, since then the vehicle occupant is subjected to less deceleration. The deeper the "valley" is, the less velocity change is achieved during the third phase and the slower is the increase of the occupant deceleration response curve, i.e., the deceleration the vehicle occupant is subjected to. The deceleration response curve provided by the front structure according to the disclosure helps to mitigate the consequences of the collision for the vehicle occupant. The deceleration drop after the initial build up, i.e., at the beginning of the third phase, is timed to reduce deceleration effects experienced by the vehicle occupant when interacting with interior protection systems of the vehicle later on during the collision process.

The first phase of the collision may last from 0 to 20 ms, ms being an abbreviation of milliseconds, preferably from 5 to 15 ms, more preferably from 8 to 12 ms, as counted from when the collision starts, i.e., the vehicle has its first contact with the object it collides with. It is desirable to keep the first phase as short as possible.

The second phase of the collision may last from 0 to 20 ms, as counted from the beginning of the second phase, which follows after the first phase, preferably from 5 to 15 ms, more preferably from 8 to 13 ms.

The third phase of the collision may last from 0 to 50 ms, as counted from the beginning of the third phase, which follows after the second phase, preferably from 10 to 40 ms, more preferably from 15 to 30 ms.

The fourth phase of the collision may last from 0 to 40 ms, as counted from the beginning of the fourth phase, which follows after the third phase, preferably from 10 to 30 ms, most preferably from 15 to 25 ms.

Preferably, the front structure is adapted to achieve at least 10%, preferably at least 15%, more preferably at least 20% of the velocity change during the first and second phases, when subjected to the full frontal barrier impact at 35 mph according to USNCAP.

The deceleration during the second phase is about as high as the deceleration during the fourth phase. The deceleration during the second phase may be as high as possible, preferably without exceeding 30 g, wherein g corresponds to 9.81 m/s2. The deceleration during the fourth phase may be as low as possible, preferably below 30 g. Thereby a considerable amount of the velocity change may be achieved during the second phase, i.e., before the vehicle occupant begins to experience deceleration effects when interacting with interior protection systems of the vehicle.

The deceleration during the third phase may be less than 80%, less than 70% and most preferably less than 60% of the deceleration during the second phase. Thereby, the desired two-peak-level curve, having a valley there between, may be obtained.

The front exterior and/or bumper, the side members and the crash boxes may be arranged, dimensioned and/or shaped in relation to each other, such that in case of the full frontal barrier impact at 35 mph according to USNCAP, during the first phase, the front exterior is compressed and/or the bumper deforms, during the second phase, the crash boxes are compressed, and during the third phase, the side members bend, whereby a deceleration achieved by the front exterior being compressed and/or the bumper deforming is less than a deceleration achieved by the crash boxes being compressed, and a deceleration achieved by the side members bending is less than the deceleration achieved by the crash boxes being compressed. Thereby, it is possible to obtain the desired impact response curve described above.

The crash boxes may be arranged, dimensioned and/or shaped, such that the crash boxes are compressed substantially after the front exterior has been compressed and/or the bumper has deformed. Thereby, the crash boxes do not start to compress until the front exterior has been fully or practically fully compressed and/or the bumper has deformed, or the crash boxes start to compress at the end of the compression of the front exterior or at the end of the deformation of the bumper. If there is both compression of the front exterior and deformation of the bumper, these two events may at least partly overlap time-wise, which overlap then occurs during the first phase.

The side members may be arranged, dimensioned and/or shaped, such that the side members bend substantially after the crash boxes have been compressed. This corresponds to a transfer from the second to the third phase of the collision process.

The side members may be arranged to at least partly bend laterally in relation to a longitudinal center-line of the vehicle, preferably more laterally than downwards, more preferably substantially laterally. By bending laterally, the mass of the side member may be moved laterally outwards in relation to the longitudinal center-line of the vehicle. Since the side member bends laterally, it can help to displace other components, such as a spring tower, laterally outwards. Further, depending on the structure of the front structure, there may be more space to bend substantially laterally instead of substantially vertically.

When the side members bend, the attachment of the spring tower to the side member will start to detach, preferably in a progressive way, such that the spring tower starts to detach at one end of the attachment to the side member, preferably at the rear end, and the detachment then gradually proceeds along the attachment to the side member. Thereby, the side members are free to bend further, which detaches the spring towers further.

The spring towers may be connected by a rally bar extending from one spring tower to the other. In that case, the rally bar may be released from one or both of the spring towers, as they are displaced laterally outwards during the third phase. Preferably the rally bar is configured such that it easily releases during the lateral outwards displacement of the spring towers, or its attachment may be configured to easily release the rally bar.

In a similar way any other bar or connection between two objects of the vehicle in the transverse direction of the vehicle may be configured to be released during the lateral outwards displacement of one or both of the two objects. This may occur during the third phase, more preferably during a first part of the third phase.

In order to bend in a desired way, the side members may comprise at least one bend zone, preferably an uneven number of bend zones, most preferably three bend zones. If using three bend zones, the side member can be pre-determined to bend like a V, thereby e.g., helping to displace other components, such as the spring tower, laterally outwards.

The side members may further comprise a support at their respective rear ends. The support may be arranged to help promoting lateral bending of the side members, while it at the same time the support may be adapted to prevent vertical bending, e.g., by being stiff in that direction. The support may e.g., be triangular or Y-shaped. An example of a support is disclosed in patent document U.S. Pat. No. 6,705,670 B2.

The front structure may, as an option, comprise a subframe, located vertically below the side members, the subframe being arranged, dimensioned and/or shaped to bend simultaneously with the side members. The subframe may be adapted to substantially bend in a vertical direction in case of a frontal collision, preferably bending downwards. The subframe thus bends during the third phase.

The front structure may, if it comprises a subframe, also comprise a pair of lower load-path crash boxes arranged at a front end of the subframe. The lower load-path crash boxes may be adapted to be compressed substantially simultaneously with the crash boxes located at the front ends of the side members, i.e., during the second phase of the collision. The subframe and the lower load-path crash boxes may in that case form a lower load path, which is helpful to distribute load in case of a frontal collision.

The subframe may be arranged to be detachable from one or both of the side members, e.g., by means of a pyrotechnic detachment device, during bending of the side members or when the side members have bent. The subframe may receive a signal to detach at the beginning of the third phase, while the actual detachment occurs later during the third phase.

The front structure may, as an option, comprise an engine mount, which is adapted to fasten the engine to one of the side members. The engine mount is adapted to rupture when the side members bend, i.e., during the third phase. Preferably, the engine mount is adapted to rupture when the side members start to bend, i.e., at the beginning of the third phase. Thereby, the engine mount is prevented from restricting the bending of the side member.

As mentioned above the front structure may comprise a spring tower, or preferably a pair of spring towers, attached to the side member by an attachment means, the spring tower being adapted to support a suspension of the vehicle. The attachment means may be arranged such that the spring tower is adapted to detach from the side member during bending of the side member, i.e., during the third phase, preferably during an early part of the third phase.

As the side member bends, the spring tower may be arranged to detach progressively, i.e., the detachment develops gradually over a period of time. The detachment may develop continuously or step-wise, e.g., dependent on type and configuration of attachment means.

The attachment means may be a breakable attachment means, which is arranged to break at a predetermined breaking force. Further, the size of the predetermined breaking force may vary along the attachment of the spring tower to the side member, e.g., to provide a preferred starting point for the detachment of the spring tower from the side member.

The spring tower may be arranged to move laterally outwards and/or longitudinally rear-wards in relation to the rest of the vehicle during bending of the side member. Thereby the spring tower, which may be more rigid than e.g., the side member and the outer side member, is moved at least partly out of the way, such that a vehicle occupant is subjected to no or as little risk of injury as possible. The spring tower being more rigid means that it is less prone to deformation and/or compression than associated components, e.g., the side member. This may be due to the shape, choice of material and/or thickness of material. The side member may be predesigned for bending, e.g., in the bend zones as described above.

The progressive detachment may, in principle, start anywhere along the attachment between the spring tower and the side member. However, it may be preferable to arrange the attachment means, such that the progressive detachment starts at either the rearward-facing side of the spring tower or the forward-facing side of the spring tower, since the detachment will then only progress in one direction, forwards respectively rearwards.

The attachment means may be arranged to provide the progressive detachment of the spring tower from the side member starting at a rearward-facing side of the spring tower and progressing in a forward direction of the vehicle. This may help to displace the spring tower laterally outwards and/or longitudinally rearwards in relation to the rest of the vehicle during bending of the side member.

As an alternative, the attachment means may be arranged to provide the progressive detachment of the spring tower from the side member starting at a forward-facing side of the spring tower and progressing in a rearward direction of the vehicle.

The front structure arrangement may be arranged such that the bending of the side member cooperates with the detachment of the spring tower, such that increased bending of the side member allows further progressing of the detachment of the spring tower, thereby allowing the spring tower to move further laterally outwards, while the further progressing of the detachment of the spring tower allows the side member to increase bending and so on. More bending thus allows further detachment and vice versa.

The spring tower may be more rigid than the side member, such that the side member starts to bend before the spring tower starts to deform, when the front structure arrangement is subjected to the substantially longitudinal force. The side member may be predesigned for bending, e.g., in the bend zones as described above.

The attachment means may comprise discrete attachment members, such as rivets, screws, bolts or spot-welds. Welding may be suitable when the materials of the spring tower and the side member are of the same type, e.g., steel. When two different material types are used, e.g., a spring tower of aluminum and a side member of steel, discrete attachment members adapted to combine different materials may be used, such as rivets, screws and/or bolts. These discrete attachment members may also be suitable when the materials of the spring tower and the side member are of the same type.

The strength of the attachment means, i.e., degree of attachment, may be variable along the attachment between the spring tower and the side member. Thereby, e.g., a suitable starting point for the detachment may be selected. The strength may be varied along the attachment means e.g., by varying the number and distribution of discrete attachment members per area unit and/or by varying the strength of the discrete attachment members. The discrete attachment members may be located wherever it is suitable along the attachment means. They may be evenly or unevenly distributed over the attachment means.

The degree of attachment may be controlled by altering the number of discrete attachment members, the individual attachment area of each discrete attachment member and/or a strength of an individual attachment member, e.g., by varying its size. The strength of the attachment means is further preferably selected such that the attachment means is deigned to detach at a lower force than a force needed to break the side member, outer side member or an optional cross member of the vehicle, such as the rally bar.

As an alternative, or as a complement, to discrete attachment members the attachment means may comprise a continuous attachment member, such as a glue string or a continuous weld.

The front structure may further comprise a lower tie bar being adapted to fasten the engine to the subframe, the lower tie bar being adapted to rupture, when the side members and/or the subframe bend/bends. There may, for example be a left lower tie bar and a right lower tie bar for fastening of the engine. The tie bars then rupture during the fourth phase.

The front structure may further be arranged, shaped and/or dimensioned such that, during the fourth phase, the at least one stiff component is adapted to stack up against the body back-up structure, a deceleration achieved by the at least one stiff component stacking up against the body back-up structure being greater than a deceleration achieved by the side members bending. This will help to obtain the desired two-peak-level curve.

In a second aspect of the present disclosure, there is provided a vehicle comprising the above-described front structure.

In a third aspect of the present disclosure, there is provided a method for absorbing collision energy in case of a frontal collision by means of a front structure as described above. In particular, the frontal collision may be a full frontal barrier impact at 35 mph according to USNCAP. According to the method, there is a course of events during the collision, comprising one or more of the events described above, resulting in a desired impact response curve, as described above.

BRIEF DESCRIPTION OF THE DRAWINGS

The present disclosure will hereinafter be further explained by means of non-limiting examples with reference to the below drawings, wherein:

FIG. 3b is diagram illustrating an impact response curve with deceleration versus stopping distance for the vehicle of FIG. 3a;

It should be noted that the appended drawings are not necessarily drawn to scale and that the dimensions of some features of the present disclosure may have been exaggerated for the sake of clarity.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art. Furthermore, details from two or more of the embodiments may be combined with each other.

Figure 1:
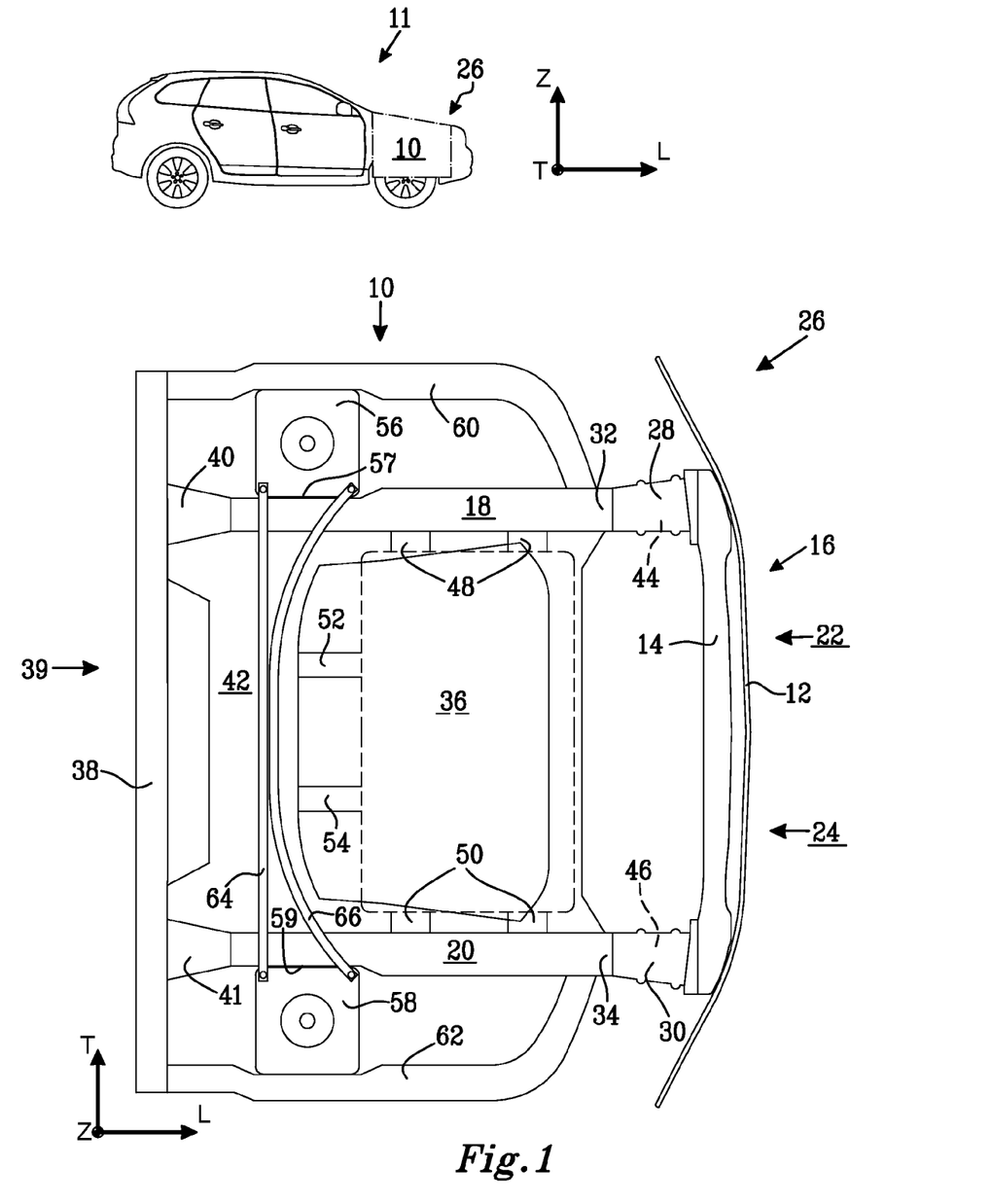
FIG. 1 is a schematic top view of a front structure according to the disclosure.

FIG. 1 schematically illustrates a front structure 10 of a vehicle 11 according to the disclosure. The front structure 10 comprises a front exterior 12 and a bumper 14 at a front end 16 of the front structure 10. The front exterior 12 may be a soft nose, which is a term commonly used for a front plastic cover of the vehicle. The front structure 10 further comprises a pair of side members 18, 20 arranged in a longitudinal direction L of the vehicle at a respective left-side portion 22 and a right-hand portion 24 of a front portion 26 of the vehicle. The front structure 10 also comprises a pair of crash boxes 28, 30 arranged at a respective front end 32, 34 of each of the side members 18, 20, which crash boxes 28, 30 have a lower axial strength than the side members 18, 20, i.e., in the longitudinal direction L. In addition, the front structure 10 comprises at least one stiff component, such as an engine 36, see dashed contour, and a body back-up structure 38, located at a rear end 39 of the front portion 26. The side members 18, 20 are preferably attached to the body back-up structure 38 by means of a support 40, 41, which form part of the respective side members 18, 20. The support 40, 41 may be triangular or Y-shaped.

In the illustrated embodiment, the front structure 10 further comprises a subframe 42 located vertically below the side members 18, 20. At the front end of the subframe 42, there is a pair of lower load-path crash boxes 44, 46, which however are not visible in FIG. 1, since they are obscured by the crash boxes 28, 30 at the front ends 32, 34 of each of the side members 18, 20. The subframe 42 and the lower load-path crash boxes 44, 46 form a lower load path for forces in case of a frontal collision.

The engine 36 is attached to the side members 18, 20 by means of at least one engine mount 48, 50. The engine 36 is further attached to the subframe 42 by means of a lower left tie bar 52 and a lower right tie bar 54.

The illustrated front structure 10 further comprises a pair of spring towers 56, 58 located between each of the side members 18, 20 and a respective outer side member 60, 62 at the left-side portion 22 and the right-hand portion 24 of the front portion 26 of the vehicle. The spring towers 56, 58 are adapted to support a suspension of the vehicle. The spring towers 56, 58 are attached to the side members 18, 20 by a respective attachment means 57, 59, which may e.g., comprise a plurality of discrete attachment members, such as rivets. Rivets are suitable when the material types of the spring tower and the side member are different, e.g., the spring tower 56, 58 being of aluminum and the side member 18, 20 of steel.

The outer side members 60, 62 are located vertically above, i.e., as seen in z direction, and laterally outwards of the side members 18, 20, i.e., as seen in a transverse direction T. The outer side member 60, 62 is also known as a shot-gun or an amazon bar. As an option, the two spring towers 56, 58 may be connected by a rally bar. In the illustrated embodiment of FIG. 1, there is a straight rear rally bar 64 and a curved front rally bar 66. One, or both of the rally bars 64, 66, may be dispensed with.

Figure 2:
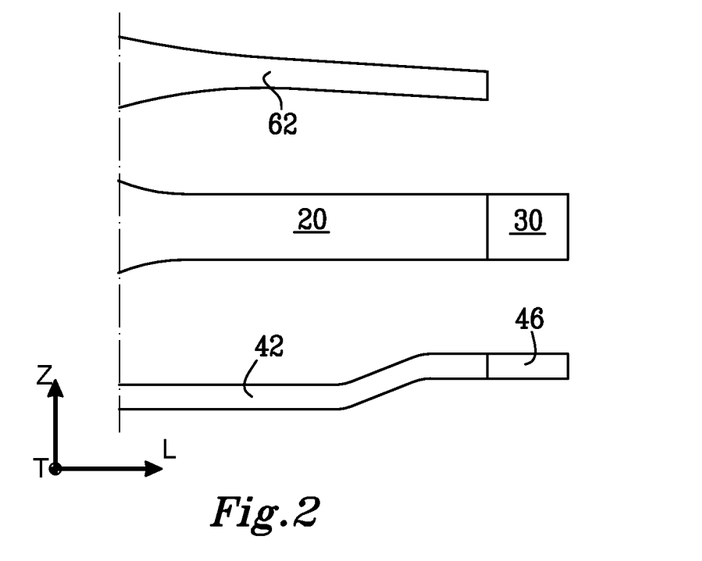
FIG. 2 is a schematic side view of the front structure of FIG. 1.

FIG. 2 is a schematic side view of the front structure 10. In this perspective, it may be gleaned that the subframe 42 is located vertically below the side members 18, 20. The lower load-path crash boxes 44, 46 are located vertically below the crash boxes 28, 30, in this case straight below. The outer side members 60, 62 are located vertically above the side members 18, 20 and do not extend as far forwards as the side members 18, 20 in the longitudinal direction L.

Figure 3A:
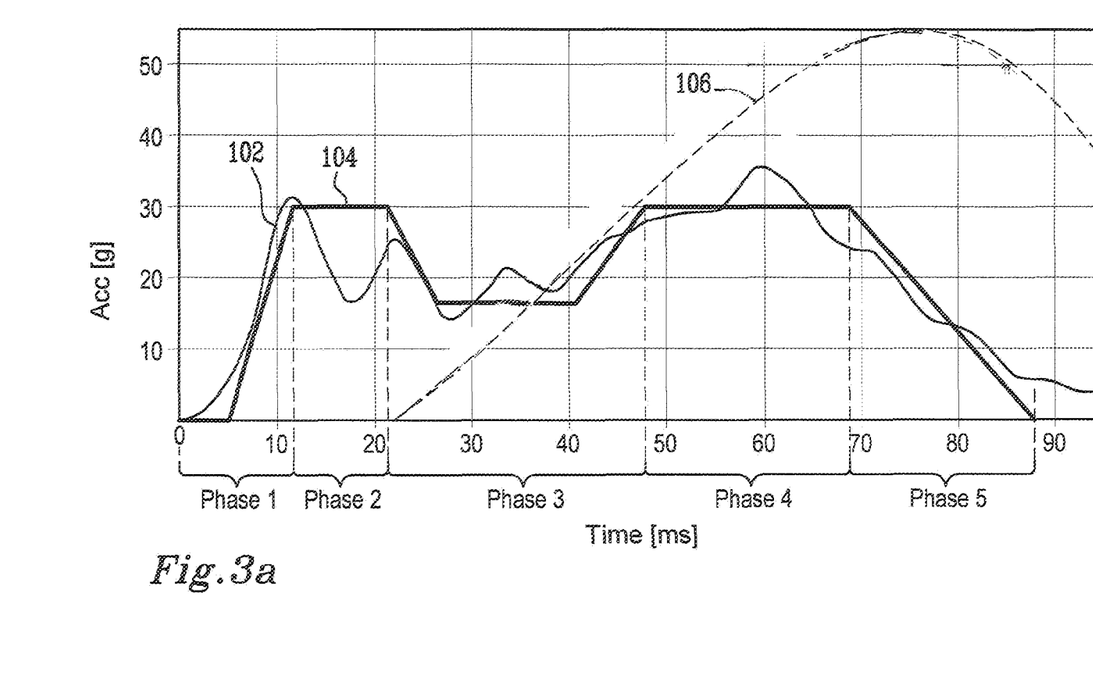
FIG. 3a is a diagram illustrating an impact response curve with deceleration versus time, when a vehicle comprising a front structure according to the disclosure is subjected to a full frontal barrier impact at 35 mph according to USNCAP.

FIG. 3a is a diagram showing impact response pulse with deceleration, y-axis, versus time, x-axis, when subjected to a full frontal barrier impact at 35 mph according to USNCAP. The time is counted in milliseconds, abbreviated ms, from the beginning of the collision. The deceleration is counted in g, wherein g corresponds to 9.81 m/s2. The area below the curves corresponds to a velocity change. The smooth line represents a simulated response pulse 102, while the curve comprising straight lines illustrates a target pulse 104.

The target pulse 104 comprises in sequence:
- a first phase, during which deceleration increases,
- a second phase, having a first peak level of the deceleration,
- a third phase, during which the deceleration is less than during the second phase,
- a fourth phase, having a second peak level of the deceleration, during which fourth phase the deceleration is greater than during the third phase, and
- a fifth phase, during which the deceleration decreases.

The phases, and what is happening at the front structure 10 of the vehicle 11 during the different phases, are described below in conjunction with FIGS. 4-8.

It is desirable that as much as possible of the velocity change is achieved during the first and second phases of the collision, i.e., substantially before the vehicle occupant is subjected to a deceleration when interacting with interior protection systems of the vehicle, see dashed line 106 of FIG. 3a showing an occupant deceleration response curve. In the illustrated case about 24% of the velocity change is achieved during the first and second phases.

Further, the deceleration during the fourth phase is about as high as the deceleration during the second phase. In the illustrated case, the deceleration during the second phase of the target pulse 104 is about 100% of the deceleration during the fourth phase, i.e., the peak levels are at similar levels, while for the simulated response pulse 102 the deceleration is about 90%. The deceleration during the second phase is preferably as high as possible, preferably without exceeding 30 g, g corresponding to 9.81 m/s2. The deceleration during the fourth phase may be as low as possible, preferably below 30 g.

The deceleration during the third phase is lower than during the second phase, i.e., the third phase forms a "valley" in both the simulated response pulse 102 and the target pulse 104, between the peak levels of the second phase and the fourth phase. This is beneficial, since then the vehicle occupant is subjected to less deceleration. In particular, the beginning of the occupant deceleration response curve 106 ramps up in a slow way. The deeper the "valley" is, the less velocity change is achieved during the third phase and the slower is the increase of the occupant deceleration response curve 106. This helps to mitigate the consequences of the collision for the vehicle occupant. The deceleration drop after the initial build up, i.e., at the beginning of the third phase, is timed to reduce deceleration effects experienced by the vehicle occupant when interacting with interior protection systems of the vehicle later on during the collision process.

Figure 3B:
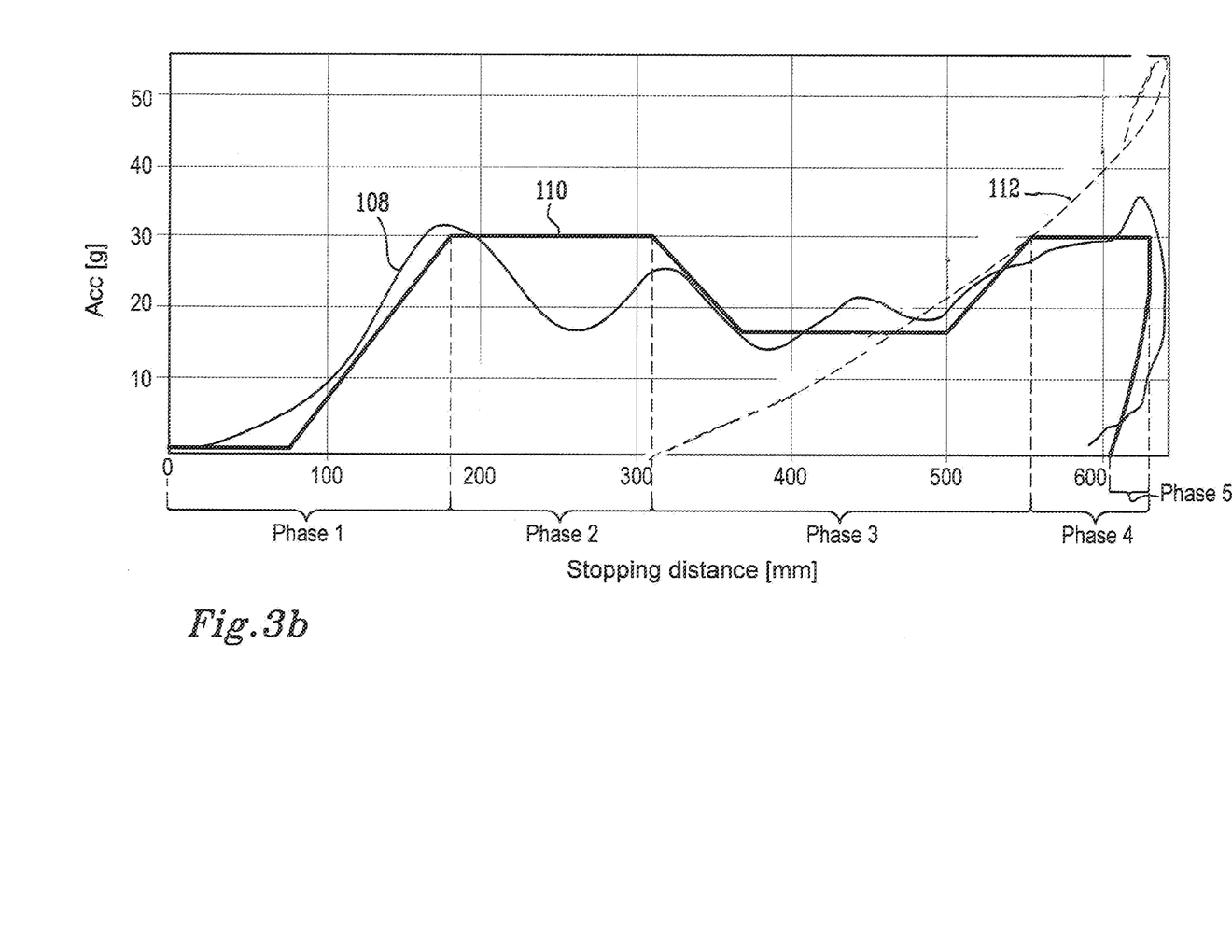

FIG. 3b shows the corresponding curves with deceleration, given in g, as a function of stopping distance, given in millimeters, abbreviated mm, i.e., how much the vehicle is compressed. Similar as for FIG. 3a, there is a simulated response pulse 108, a target pulse 110, and an occupant response curve 112. The phases of the response curves, which are shown in FIG. 3a, are indicated in FIG. 3b, as well. The fifth phase overlaps partially with the fourth phase in FIG. 3b, since there is a certain spring-back effect.

The graphs of FIGS. 3a and 3b are representative of a certain vehicle model. Another vehicle model may have another shape of the graphs although the phases, which are described above, will be similar. For example, the duration of one or more of the phases may differ from that of FIGS. 3a and 3b and/or the level of deceleration may differ.

Figure 4:
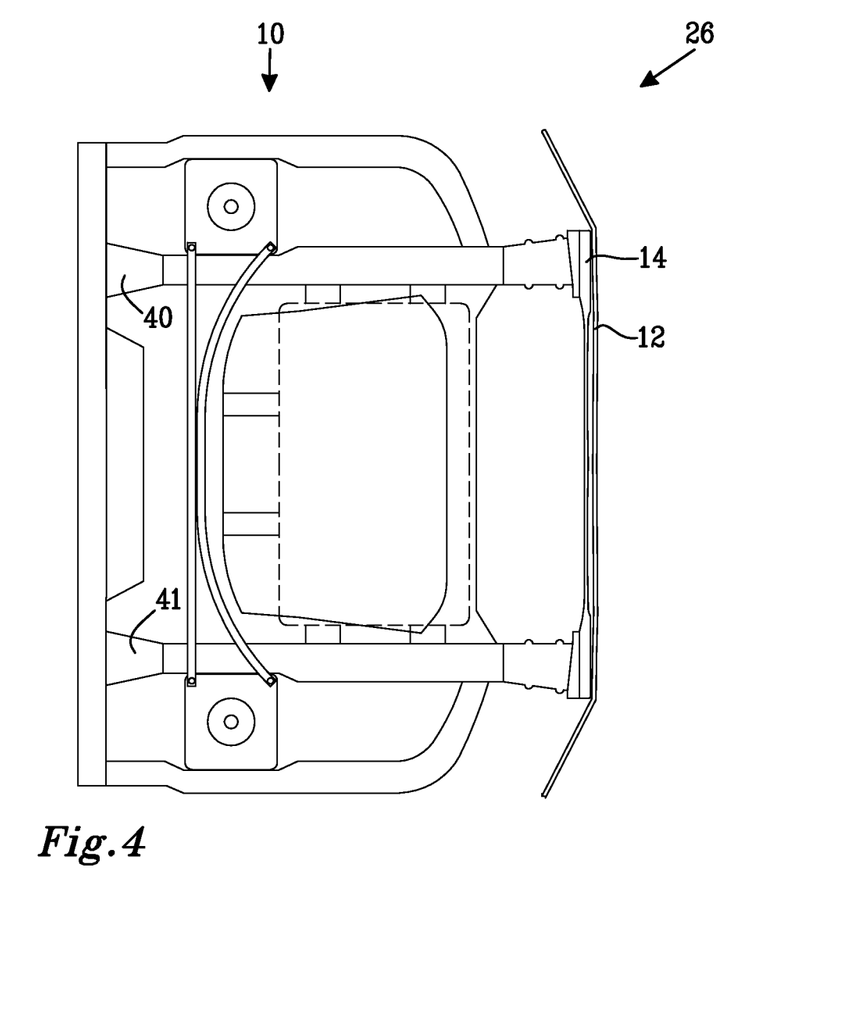
FIG. 4 is a schematic view of the front structure of FIG. 1 during a first phase of the collision.
Figure 5:
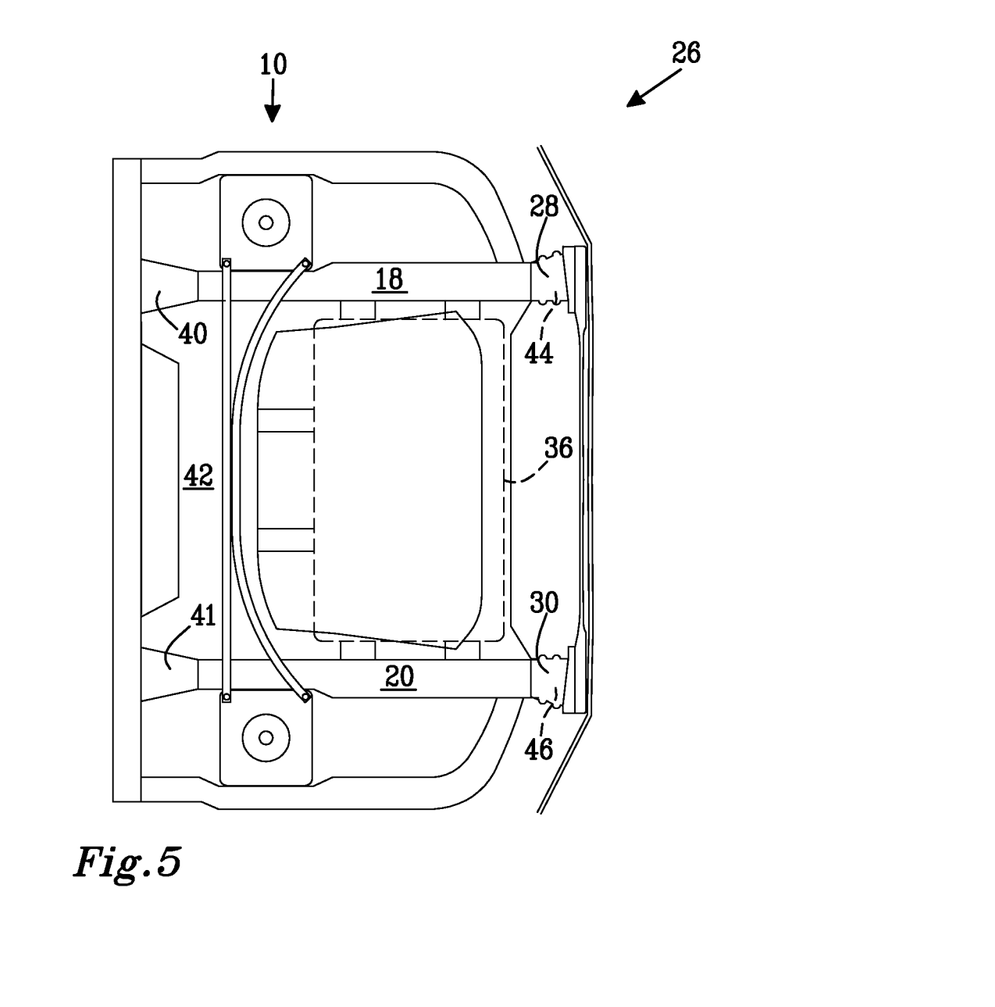
FIG. 5 is a schematic view of the front structure of FIG. 1 during a second phase of the collision.

FIG. 4 schematically illustrates what is happening during the first phase of the collision. When the vehicle is subjected to the full frontal barrier, the front exterior 12 is compressed and the bumper 14 deforms, thereby absorbing collision energy. The front exterior 12 starts being compressed before the bumper 14 starts to deform. Then, for a few milliseconds, the front exterior 12 is compressed, while the bumper 14 is deformed at the same time. Thereafter the bumper 14 continues to deform until, in the illustrated example, about 13 ms as counted from the beginning of the collision, corresponding to 180 mm stopping distance, also as counted from the beginning of the collision. See the curves of FIGS. 3a and 3b. This is the end of the first phase.

During the second phase of the collision, the crash boxes 28, 30 and the lower load-path crash boxes 44, 46 are compressed simultaneously. See FIG. 5. However, in the perspective of FIG. 5, the lower load-path crash boxes 44, 46 are hidden by the crash boxes 28, 30, since they are straight below. The crash boxes 28, 30 have a lower axial strength than the side members 18, 20. The crash boxes 28, 30 are thus fully or substantially fully compressed before the side members 18, 20 start to deform. Similarly, the lower load-path crash boxes 44, 46 have a lower axial strength than the subframe 42. The lower load-path crash boxes 44, 46 are thus also fully or substantially fully compressed before the subframe 42 starts to deform. In the illustrated embodiment, the lower load-path crash boxes 44, 46 have the same extension as the crash boxes 28, 30 in the longitudinal direction L, such that they are fully or substantially fully compressed at the same moment in time, in this case at about 23 ms, as counted from the beginning of the collision, or 315 mm stopping distance, also as counted from the beginning of the collision. See the curves of FIGS. 3a and 3b.

Figure 6:
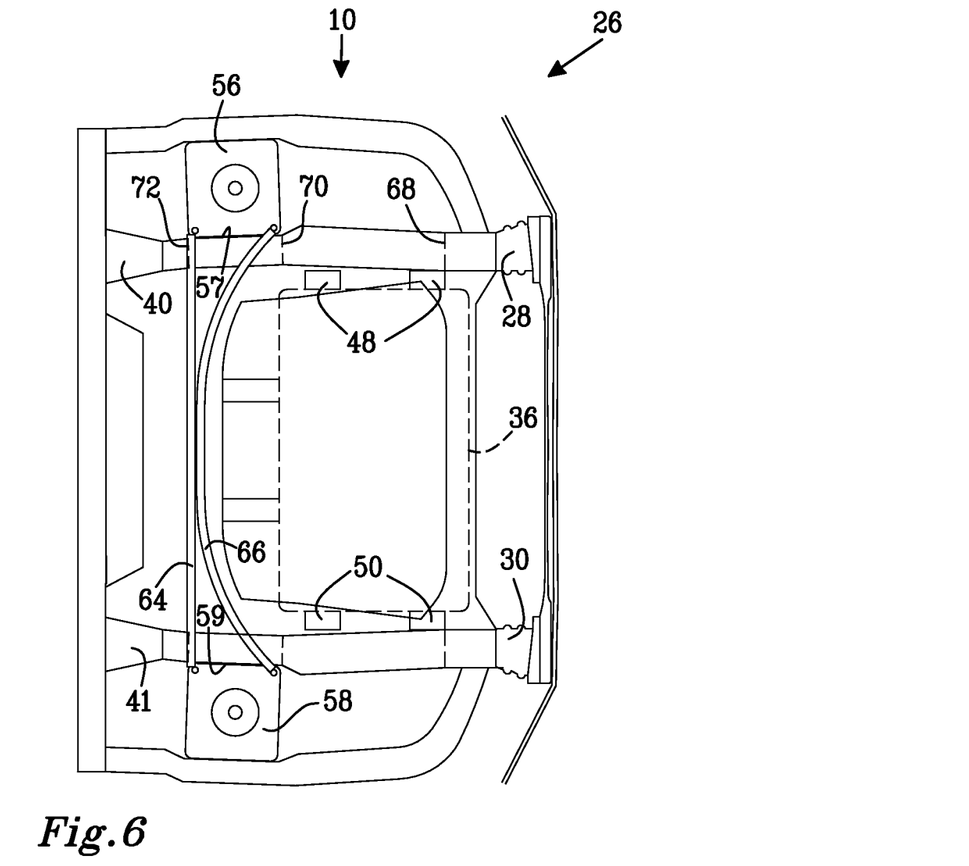
FIG. 6 is a schematic view of the front structure of FIG. 1 during an early part of a third phase of the collision.

When the crash boxes 28, 30 are compressed, the side members 18, 20 start to deform. See FIG. 6 illustrating an early part of the third phase. The deceleration is less during the third phase than during the second phase. In the illustrated front structure 10, the side members 18, 20 are arranged, shaped and/or dimensioned to bend substantially laterally. The supports 40, 41 of the side members 18, 20 are used to assist obtaining the preferred bending. Further, the side members 18, 20 may be provided with predetermined bend zones 68, 70, 72 which are arranged to promote the desired substantially lateral bending. It has been found to be beneficial to use an odd number of bend zones, and in particular three bend zones 68, 70, 72 as in the illustrated embodiment. By the provision of three bend zones, the side member 18, 20 will bend like a V, thereby helping to displace the relatively stiff spring tower 56, 58, which is more rigid and hence less deformable than the side member 18, 20, laterally outwards in relation to the longitudinal center-line of the vehicle. Due to its shape, material and/or material thickness, the support 40, 41 is stiffer than the rest of the side member 18, 20 and thus deforms to a much lesser extent. In particular, the support 40, 41 helps to make the side members 18, 20 bend mainly laterally and not to the same degree, or not at all, in a vertical direction z.

At the same time as the side members 18, 20 start to bend laterally, the subframe 42 starts to bend substantially in the vertical direction z, preferably substantially downwards. The vehicle may be provided with a steering gear, which in that case preferably is attached to the subframe 42 in such a way that that the subframe 42 pulls the steering gear downwards during bending of the subframe 42.

Further, when the side members 18, 20 bend, the engine mount 48, 50 will start to rupture and/or attachment of the spring towers 56, 58 to the side member 18, 20 will start to detach. The attachment means 57, 59 attaching the spring towers 56, 58 to the side members 18, 20 are preferably arranged to detach in a progressive way, such that the spring tower 56, 58 starts to detach at a rear end of the attachment means 57, 59 and the detachment then gradually proceeds along the attachment means 57, 59 in a forward direction. Thereby, the side members 18, 20 are free to bend further, which will rupture the engine mount 48, 50 more and/or detach the spring towers 56, 58 further. Thereby, the side members 18, 20 are free to bend further and so on.

In the illustrated embodiment, the force needed to progressively detach the spring tower 56, 58 from the side member 18, 20 may be determined by e.g., selecting the number and distribution of the discrete attachment members, e.g., the rivets, per area unit and/or by varying the strength of the discrete attachment members. First, the rearmost rivet breaks, then the second rearmost rivet and so on. The detachment is in this case step-wise, with each step corresponding to breaking a rivet. The detachment may further be controlled by the location of the predetermined bend zones 68, 70, 72 in relation to the attachment means 57, 59. It may be appropriate to locate the discrete attachment members, such that the predetermined bend zones 68, 70, 72 are free from discrete attachment members since otherwise a discrete attachment member could locally influence the bending properties. Purely as an example, it would be difficult to bend the side member 18, 20 along a vertical line going through a rivet.

In order to achieve the desired decrease of deceleration during the third phase, it is desirable that the rupture of the engine mount 48, 50, the detachment of the attachment of the spring towers 56, 58, the bending of the side members 18, 20 and/or the bending of the subframe 42 starts at the same time, or at least substantially the same time, i.e., within a few milliseconds of each other.

The spring towers 56, 58 may be connected by a rally bar 64, 66 extending from one spring tower 56 to the other 58. In that case, the rally bar 64, 66 is released from the spring towers 56 and 58, as they are displaced laterally outwards during the third phase.

If there is any other cross member, not illustrated, it is preferred that it is released from its attachment during the early part of the third phase, when the side members 18, 20 bend, such that the side members 18, 20 thereafter are free to bend.

In addition, one or both of the lower left tie bar 52 and the lower right tie bar 54 may be adapted to rupture during the third phase, preferably during the early part, and e.g., when the rally bar 64, 66 releases. Thereafter, the engine 36 is free to move.

As an option, the subframe 42 may be arranged to be detachable from the side members 18, 20, e.g., by means of a pyrotechnic detachment device. In that case, the subframe 42 may still be attached to the side members 18, 20 during the third phase, or at least during a part of the third phase of the collision.

Figure 7:
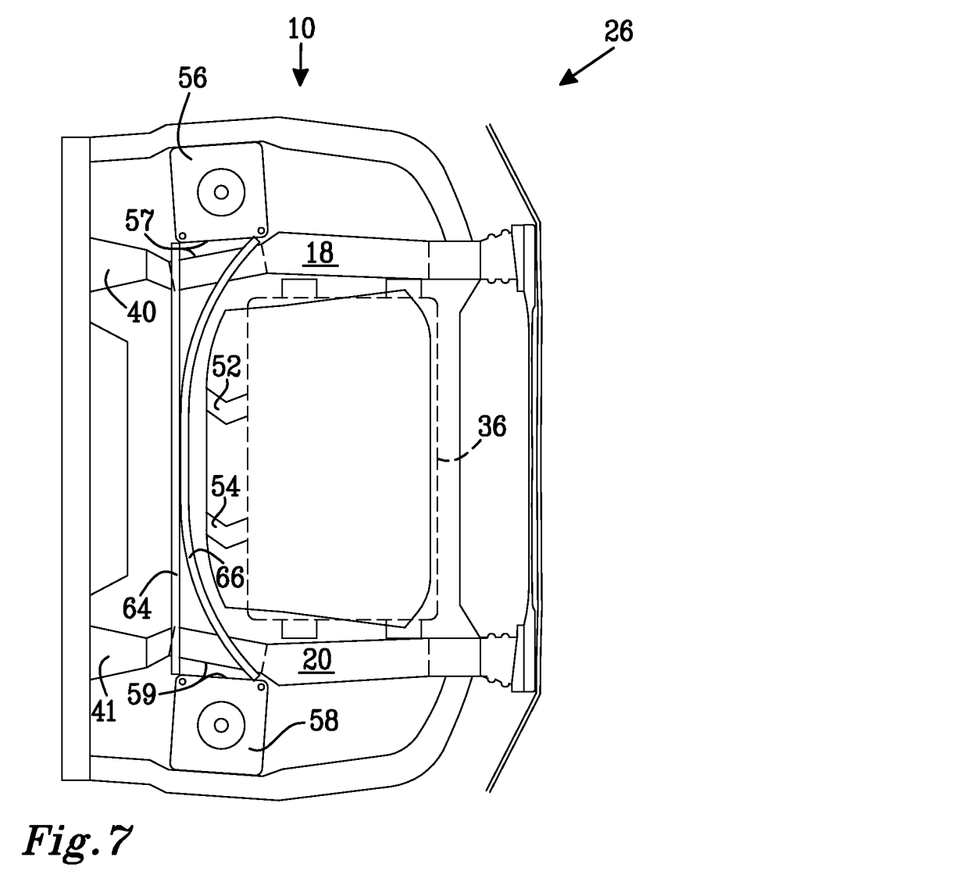
FIG. 7 is a schematic view of the front structure of FIG. 1 during a later part of the third phase of the collision.
Figure 8:
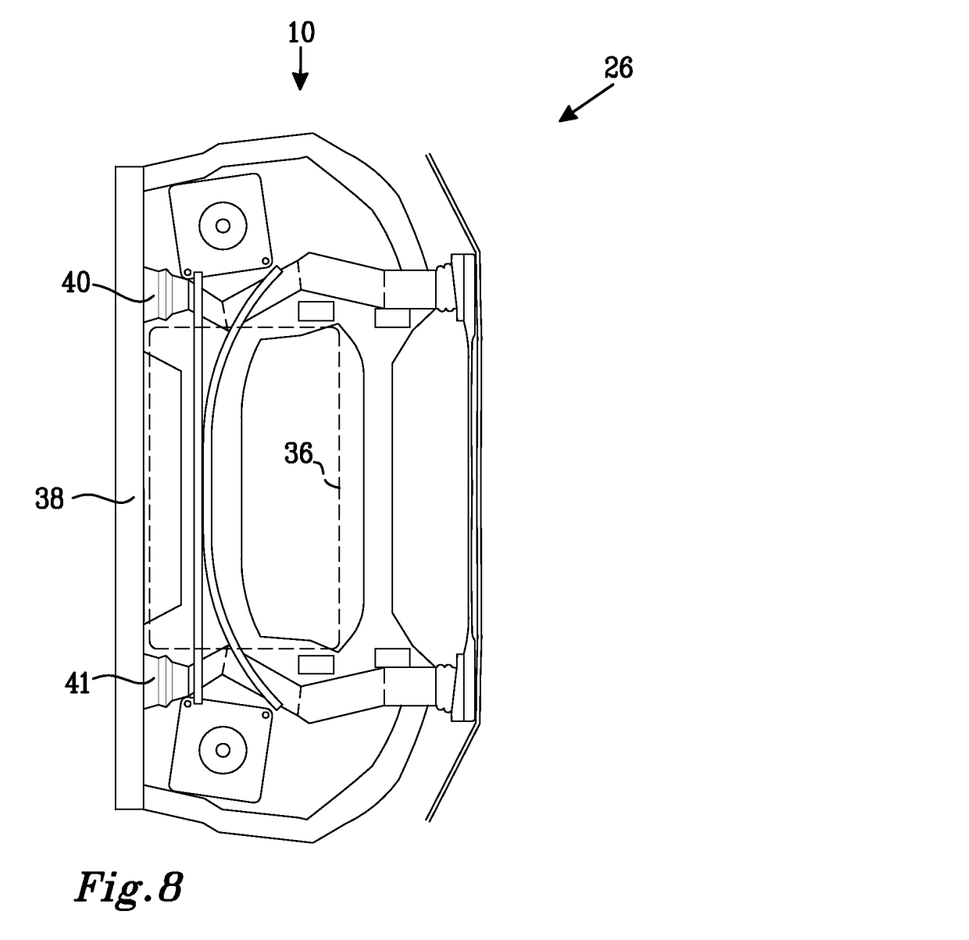
FIG. 8 is a schematic view of the front structure of FIG. 1 during a fourth phase of the collision.

FIG. 7 illustrates a later part of the third phase of the collision. The side members 18, 20 are bent further laterally to a V-shape. Thereby, the attachment of the spring towers 56 and 58 to the side members 18, 20 are broken and the spring towers 56 and 58 have been displaced laterally outwards and rearwards in the vehicle, at least partly being pushed by the bending side member 18, 20.

The third phase continues in the illustrated example until about 47 ms, as counted from the beginning of the collision, or 560 mm stopping distance, also as counted from the beginning of the collision. See the curves of FIGS. 3*a* and 3*b*.

During the fourth phase, the stiff components of the engine compartment, such as the engine 36, stack up with the body back-up structure 38. See FIG. 8. The fourth phase continues in the illustrated example until about 68 ms, as counted from the beginning of the collision, or 630 mm stopping distance. See the curves of FIGS. 3*a* and 3*b*.

During the fifth phase there is a certain spring-back effect, such that the stopping distance, i.e., the compression of the front structure 10, actually decreases to about 600 mm. See the curves of FIG. 3*b*.

The desired course of events during the collision is obtained by arranging, dimensioning and/or shaping the above-mentioned components in relation to each other. The components may be located geometrically behind or beside each other. The components may be made of materials having different strength properties or material thickness. The components may have a certain shape, such as the support at the rear end of the side member. Hence, it may be achieved that the components deform in the desired order, as described above for the first to fourth phases.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings. Additionally, the features of various implementing embodiments may be combined to form further embodiments of the invention.

What is claimed is:

1. A front structure of a vehicle, the front structure comprising:
a front exterior and/or a bumper;
a pair of side members arranged in a longitudinal direction of the vehicle at a respective left-side portion and right side portion of a front portion of the vehicle;
a pair of crash boxes having a lower axial strength than the side members, each crash box being arranged at a front end of a respective side member;
at least one stiff component that is more stiff than the front exterior and/or the bumper; and
a body back-up structure located at a rear end of the front portion;
wherein the front structure is adapted to give an impact response curve with deceleration versus time, when subjected to a full frontal barrier impact at 35 mph, the impact response curve having in sequence
a first phase during which deceleration increases,
a second phase forming a first peak level of the deceleration,
a third phase during which the deceleration is less than during the second phase, and
a fourth phase forming a second peak level of the deceleration, during which fourth phase the deceleration is greater than during the third phase.

2. The front structure according to claim 1 wherein the front exterior and/or bumper, the side members and the crash boxes are arranged, dimensioned and/or shaped in relation to each other, such that in case of the full frontal barrier impact at 35 mph,
during the first phase, the front exterior is compressible and/or the bumper is deformable,
during the second phase, the crash boxes are compressible, and
during the third phase, the side members are bendable,
whereby a deceleration achievable by the front exterior being compressed and/or the bumper deforming is less than a deceleration achievable by the crash boxes being compressed, and a deceleration achievable by the side members bending is less than the deceleration achievable by the crash boxes being compressed.

3. The front structure according to claim 1 wherein the crash boxes are arranged, dimensioned and/or shaped such that the crash boxes are compressible substantially after the front exterior has been compressed and/or the bumper has deformed.

4. The front structure according to claim 1 wherein the side members are arranged, dimensioned and/or shaped such that the side members are bendable substantially after the crash boxes have been compressed.

5. The front structure according to claim 2 wherein the side members are arranged to at least partly bend laterally in relation to a longitudinal center-line of the vehicle during the third phase.

6. The front structure according to claim 1 wherein each side member comprises a support at a rear end of the side member.

7. The front structure according to claim 6 wherein each support is a triangular or Y-shaped support.

8. The front structure according to claim 1 further comprising a subframe located vertically below the side members, the subframe being arranged, dimensioned and/or shaped to bend simultaneously with the side members.

9. The front structure according to claim 8 further comprising a pair of lower load-path crash boxes arranged at a front end of the subframe, the lower load-path crash boxes being adapted to be compressed substantially simultaneously as the crash boxes located at the front ends of the side members.

10. The front structure according to claim 8 wherein the subframe is arranged to be detachable from one or both of the side members during bending of the side members or when the side members have bent.

11. The front structure according to claim 10 wherein the subframe is arranged to be detachable from one or both of the side members by means of a pyrotechnic detachment device.

12. The front structure according to claim 1 wherein the at least one stiff component comprises an engine, and wherein the front structure further comprises an engine mount adapted to fasten the engine to one of the side members, the engine mount being adapted to rupture when the side member bends.

13. The front structure according to claim 1 further comprising a spring tower attached to one of the side members by an attachment means, the spring tower being adapted to support a suspension of the vehicle, and the attachment means being arranged such that the spring tower is adapted to detach progressively from the one side member during bending of the one side member.

14. The front structure according to claim 8 wherein the at least one stiff component comprises an engine, and wherein the front structure further comprises a lower tie bar adapted to fasten the engine to the subframe, the lower tie bar being adapted to rupture when the side members and/or the subframe bend/s.

15. The front structure according to claim 1 wherein during the fourth phase the at least one stiff component is adapted to stack up against the body back-up structure, a deceleration achievable by the at least one stiff component stacking up against the body back-up structure being greater than a deceleration achievable by the side members bending.

16. The front structure according to claim 1 wherein the front structure is adapted to achieve at least 10% of the velocity change during the first and second phases, when subjected to the full frontal barrier impact at 35 mph.

17. The front structure according to claim 1 wherein the front structure is adapted to achieve at least 15% of the velocity change during the first and second phases, when subjected to the full frontal barrier impact at 35 mph.

18. The front structure according to claim 1 wherein the deceleration during the third phase is less than 80% of the deceleration during the second phase.

19. The front structure according to claim 18 wherein the deceleration during the third phase is less than 70% of the deceleration during the second phase.

20. A front structure of a vehicle, the front structure comprising:
 a bumper;
 first and second side members arranged in a longitudinal direction of the vehicle at a left-side portion and a right-side portion, respectively, of a front portion of the vehicle;
 first and second crash boxes located behind the bumper, the first crash box being arranged at a front end of the first side member, and the second crash box being arranged at a front end of the second side member, the crash boxes having a lower axial strength than the side members; and
 a body back-up structure located at a rear end of the front portion and connected to the side members;
 wherein the front structure is adapted to give an impact response curve with deceleration versus time, when subjected to a full frontal barrier impact at 35 mph, the impact response curve having in sequence
 a first phase during which deceleration increases,
 a second phase forming a first peak level of the deceleration,
 a third phase during which the deceleration is less than during the second phase, and
 a fourth phase forming a second peak level of the deceleration, during which fourth phase the deceleration is greater than during the third phase.

\* \* \* \* \*